United States Patent
Doi et al.

[11] Patent Number: 5,978,919
[45] Date of Patent: Nov. 2, 1999

[54] MOBILE COMPUTER AND A METHOD FOR CONTROLLING IN A MOBILE COMPUTER

[75] Inventors: Miwako Doi; Takahiro Harashima, both of Kanagawa-ken, Japan

[73] Assignee: Kabushiki Kaisha Toshiba, Kawasaki, Japan

[21] Appl. No.: 08/912,173

[22] Filed: Aug. 15, 1997

[30] Foreign Application Priority Data

Sep. 18, 1996 [JP] Japan ................................. 8-246376

[51] Int. Cl.⁶ ................................................ G06F 12/14
[52] U.S. Cl. ......................... 713/202; 713/200; 713/201
[58] Field of Search ........................... 395/186, 188.01, 395/187.01, 750.01, 750.06; 380/3, 4, 23, 25; 713/200, 202, 201

[56] References Cited

U.S. PATENT DOCUMENTS

| | | | |
|---|---|---|---|
| 4,959,860 | 9/1990 | Watters et al. | 380/25 |
| 5,406,261 | 4/1995 | Glenn | 340/571 |
| 5,471,203 | 11/1995 | Sasaki et al. | 340/825.31 |
| 5,500,890 | 3/1996 | Rogge et al. | 340/825.33 |
| 5,537,544 | 7/1996 | Morisawa et al. | 395/188.01 |
| 5,574,786 | 11/1996 | Dayan et al. | 380/4 |
| 5,638,513 | 6/1997 | Ananda | 395/188.01 |
| 5,682,475 | 10/1997 | Jonson et al. | 395/188.01 |
| 5,708,777 | 1/1998 | Sloan et al. | 395/188.01 |
| 5,761,485 | 12/1995 | Munyan | 395/187.01 |
| 5,790,800 | 10/1995 | Gauvin et al. | 395/200.57 |
| 5,850,517 | 8/1995 | Verkler et al. | 395/200.32 |

FOREIGN PATENT DOCUMENTS

| | | | |
|---|---|---|---|
| 0 588 083 A2 | 3/1994 | European Pat. Off. | G06F 1/00 |
| 0478 571 | 9/1996 | Germany | G06F 12/14 |
| 10228423 | 8/1998 | Japan | G06F 12/14 |

*Primary Examiner*—Robert W. Beausoliel, Jr.
*Assistant Examiner*—Wasseem H. Hamdan
*Attorney, Agent, or Firm*—Finnegan, Henderson, Farabow, Garrett & Dunner, L.L.P.

[57] ABSTRACT

A mobile computer includes an input section to input a password and an operation indication, and a password memory section to store the password to confirm the authorization of a user. Features of the mobile computer of the present invention are a security confirmation section and an unauthorized use prevention section. The security confirmation section requests the user to input the password when the operation indication for moving from one a screen of activation time to another screen is inputted by the input section. The unauthorized use prevention section turns off the power supply of the mobile computer if the input password requested by the security confirmation section does not coincide with the password stored in the password memory section.

11 Claims, 12 Drawing Sheets

| | MAIL | TELE-PHONE | MEMO | SCHE-DULE | ESTI-MATE | NEWS-PAPER | MAP GUIDE | HELP |
|---|---|---|---|---|---|---|---|---|
| | 12/31(Su) | 1/1(M) | 1/2(Tu) | 1/3(W) | 1/4(Th) | 1/5(F) | 1/6(Sa) | |
| | 1/7(Su) | 1/8(M) | 1/9(Tu) | 1/10(W) | 1/11(Th) | 1/12(F) | 1/13(Sa) | |
| | 1/14(Su) | 1/15(M) | 1/16(Tu) NEW CUSTOMER (KELLY) | 1/17(W) | 1/18(Th) | 1/19(F) | 1/20(Sa) | |
| | 1/21(Su) | 1/22(M) | 1/23(Tu) | 1/24(W) | 1/25(Th) | 1/26(F) | 1/27(Sa) | |
| | 1/28(Su) | 1/29(M) | 1/30(Tu) | 1/31(W) | 2/1(Th) | 2/2(F) | 2/3(Sa) | |

[CUT] [COPY] [PASTE] [SAVE] [CHARACTER] [HAND WRITTEN] [CANCEL] [PRINT] [SENDING]

FIG. 3

| INPUT OF SCREEN CHANGE |
| :---: |
| MAIL |
| TELEPHONE BOOK |
| MEMO |
| ESTIMATE |
| NEWSPAPER • MAGAZINE |
| MAP GUIDE |
| HELP |
| SCHEDULE DATE CHANGE |

| INDICATION | PARAMETER | TIME |
|---|---|---|
| SCHEDULE | 1/16 | 9601150830 |
| FILTERING | | 9601150833 |
| VIEWING | 13531 | 9601150833 |
| END | | 9601150834 |
| ⋮ | ⋮ | ⋮ |

*FIG. 10*

| EXTRACTED ITEM (LEVEL 1) | (LEVEL 2) | ............ | REFERENCE VALUE |
|---|---|---|---|
| FILTERING | VIEWING | | 13531 |
| | SAVE | | PARAMETER |
| | MAIL | | PARAMETER |
| | NOTES | | PARAMETER |
| ⋮ | ⋮ | | ⋮ |

*FIG. 11*

| EXTRACTED ITEM (LEVEL 1) | (LEVEL 2) | ............ | REFERENCE VALUE |
|---|---|---|---|
| ASSESSMENT PROGRAM | DATE | | APRIL 17 |
| | CUSTOMER NAME | | M. KELLY |
| | CAR TYPE | | SR-101 |
| | ASSESSED AMOUNT | | $2,000 |
| SCHEDULE | DATE OF TRADE-IN | | APRIL 24 |
| ⋮ | ⋮ | ⋮ | ⋮ |

FIG. 13

ASSESSMENT REPORT　　APRIL 17

CUSTOMER NAME　　M. KELLY

CAR TYPE　　SR-101

ASSESSED AMOUNT　　$2,000

DATE OF TRADE-IN　　APRIL 24

FIG. 14

MOBILE COMPUTER AND A METHOD FOR CONTROLLING IN A MOBILE COMPUTER

FIELD OF THE INVENTION

The present invention relates to a mobile computer and a method for controlling a mobile computer to protect the user's security without increasing the user's burden for a personal information device such as PDA (Personal Digital Assistance).

BACKGROUND OF THE INVENTION

Recently, through the development of networks and small sized computers, the use of mobile computers for personal use to easily execute schedule programs, address book programs and memo note programs have rapidly spread. In such a mobile computer, when the power supply is turned on, a schedule application program, which is most frequently used, activated first and the top-level menu is displayed.

In a general workstation or personal computer, one machine is commonly used by multiple users. It is necessary to confirm the identity of the person who is about to use the computer. Therefore, the user must input his password to confirm his identity after log-in. By contrast, in a mobile computer, it is prerequisite that the user is only one person, and it is not necessary to confirm the identity of the person who is about to use it. Therefore, input of the password is not necessary. However, in case the user leaves the mobile computer behind, it is possible that the person who next turns on the power supply may be confirmed as the true user. In short, someone other than the true user can access personal information such as schedule information, which constitutes a problem from the viewpoint of security. In order to avoid this problem, some mobile computers—like workstations and personal computers—request the user to input a password when he turns on the power supply. However, in this case, the user must input his password whenever he turns on the power supply, which complicates the user's operation of the mobile computer.

Furthermore, nowadays, many mobile computers are used by users such as businessmen who frequently work outside of the office. This kind of user connects the mobile computer to the company network by telephone or directly to the company network when working at the office. In this way, information necessary for customers (for example, stocks price, exchange rate, profile of new customers) is downloaded to the mobile computer. If necessary, the mobile computer can be connected to the company network from a public telephone to download the information. When only a small quantity of information is to be downloaded, or when a high-spread communication circuit is used, the information can be downloaded in several seconds.

However, if a large quantity of information such as image data is to be downloaded, or when using a low speed communication network, downloading can take several minutes. In this case, it is burdensome for a busy user to have to watch the mobile computer until the download is completed, when he can then turn off the power supply. Furthermore, if the user is distracted by other business while waiting for the downloading process to be completed, he sometimes forgets to return altogether. This results in the complete depletion of the battery power supply.

Furthermore, users such as businessmen sometimes negotiate with the customer by using application program (for example, simulation of insurance amount in case of life insurance, assessed amount simulation of used car and estimated price simulation of a new car in case of car business). At the end of the work day, the businessman creates a daily report describing the day's business and the customers with whom he did business. He sometimes connect the mobile computer to the company network from home or over the public telephone network and sends the report. It takes a long time for the businessman to create this kind of daily report. In order to save time, it is well known that the history of a user's operation is recorded and submitted as a daily report. In the mobile computer, personal information is stored as part of a schedule and address programs. Therefore, in this method, the personal information that the user does not intend to report is also recorded and included in the daily report. Even if the personal information is not included and if all of the operational history are included, the user feels the restraint that everything he does is managed. On the other hand, if all of the operational history is sent to a manager, the manager must extract the necessary information form the operational history. The fact that the quantity of information to be managed is large is a problem.

Furthermore, in the past, a keyword to predetermine a user's area of technical interest is registered as part of the user profile, and related information is periodically extracted from information media such as magazines or newspapers and sent to the personal information equipment. Users of such information presentation services request that the information presented be more fitted to their specific interests. Therefore, the user is asked whether he is interested in the presented information. However, in this method, the user must answer the inquiries in addition to watching the presented information and his burden increases. As another method, a question regarding the degree of interest of each inquiry is combined with the presented information and the user checks the degree of interest feedback his interest to the information presenter. However, in this method, the user must respond to the question in addition to viewing the presented information, and his burden increases. In such a situation, the user's interest can be guessed by the user's operation history. However, in the same way of the above-mentioned daily report, if all of the operation history is reported to the manager, the manager must extract the necessary information from the operation history, and the quantity of the information to be managed greatly increases.

As mentioned-above, the mobile computer of the prior art includes the following problems.

(1) In the mobile computer used by a predetermined user, if the user leaves the mobile computer behind, it is impossible to decide whether a person who uses the mobile computer next is the authorized user.

(2) If it takes a long time to transmit the information by wired or wireless and if the user does not turn off the power supply of the mobile computer after comfirming completion of the transmission, the battery will be depleted.

(3) In the method to uniformly obtain the user's operation history to support the daily report or customize the information presentation service, the user feels restrained to use the mobile computer. Furthermore, unnecessary information included in the operation history is also reported to the manager's side. Therefore, the manager's burden to extract the necessary information greatly increases.

SUMMARY OF THE INVENTION

It is an object of the present invention to provide a mobile computer which is able to strongly protect security without increasing a user's burden.

It is another object of the present invention to provide a mobile computer which is able to automatically turn off the power supply when the communication is completed.

It is another object of the present invention to provide a mobile computer which is able to effectively extract information without increasing the user's burden.

According to the present invention, there is provided a mobile computer including an input means for inputting a password and an operation indication, a password memory for storing the password to confirm the authorization of a user, comprising: a security confirmation means for requesting the user to input the password when the operation indication for moving from one screen of activation time to another screen is inputted by said input means; and an unauthorized use prevention means for turning off the power supply of said mobile computer if the input password requested by said security confirmation means does not coincide with the password stored in said password memory.

Further in accordance with the present invention, there is also provided a mobile computer, comprising: a communication means for sending and receiving information for another computer; a communication decision means for deciding whether the sending or receiving information is normally finished by said communication means; shut down means for turning off the power supply of said mobile computer if the sending or receiving information is decided to be completed normally.

Further, in accordance with the present invention, there is also provided a mobile computer, comprising: an input means for inputting a plurality of kinds of information including operation indication; a history memory means for storing the operation indication and attached information of the operation indication; extraction means for extracting the operation indication and the attached information from said history memory means according to a predetermined rule; extracted history memory means for storing the operation indication and the attached information extracted by said extraction means.

Further, in accordance with the persent invention, there is also provided a method for controlling the use of the mobile computer, comprising the steps of: storing a password to confirm the authorization of a user; inputting an operation indication for moving from one screen of activation time to another screen; requesting the user to input the password; inputting the password of the user; and turning off power supply of the mobile computer if the input password does not coincide with the stored password.

Further, in accordance with the present invention, there is also provided a method for controlling a mobile computer, comprising the steps of: transmitting information for another computer; deciding whether the transmission of the information is normally finished; and turning off a power supply of the mobile computer if the transmission of the information is decided to be completed normally.

Further, in accordance with the present invention, there is also provided a method for controlling a mobile computer, comprising steps of: inputting a plurality of kinds of information including operation indication; storing the operation indication and attached information of the operation indication; extracting the operation indication and attached information from the stored operation indication and attached information according to a predetermined rule; and storing the extracted operation indication and attached information.

Further, in accordance with the present invention, there is also provided a computer readable memory containing computer readable instructions, comprising: instruction means for causing a computer to store a password to confirm the authorization of a user; an instruction means for causing a computer to input an operation indication for moving from one screen of activation time to another screen; an instruction means for causing a computer to request the user to input the password; an instruction means for causing a computer to input the password of the user; and an instruction means for causing a computer to turn off the power supply of a mobile computer if the input password does not coincide with the stored password.

Further, in accordance with the present invention, there is also provided a computer readable memory containing computer readable instructions, comprising; an instruction means for causing a computer to transmit information for another computer; an instruction means for causing a computer to decide whether transmission of the information is completed normally; and an instruction means for causing a computer to turn off the power supply of a mobile computer if the transmission of the information is decided to be completed normally.

Further, in accordance with the present invention, there is also provided a computer readable memory containing computer readable instructions, comprising; an instruction means for causing a computer to input a plurality of kinds of information including operation indication; an instruction means for causing a computer to store the operation indication and attached information of the operation indication; an instruction means for causing a computer to extract the operation indication and attached information from stored operation indication and attached information according to a predetermined rule; and an instruction means for causing a computer to store the extracted operation indication and attached information.

BRIEF DESCRIPTION OF THE DRAWINGS

FIG. 3 is a schematic diagram of the display example of the top screen of the mobile computer.

FIG. 4 is a schematic diagram of one example of a memory format of the unauthorized use prevention section according to the first embodiment.

FIG. 5 is a schematic diagram of the display example of the password confirmation screen according to the first embodiment.

FIG. 10 is a schematic diagram of one example of a memory format of a history memory section according to the third embodiment.

FIG. 11 is a schematic diagram of one example of a memory format of extracted items according to the third embodiment.

FIG. 13 is a schematic diagram of another example of a memory format of extracted items according to the third embodiment.

FIG. 14 is a schematic diagram of a formatted example using the extracted items in FIG. 13 by a format section according to the third embodiment.

DETAILED DESCRIPTION OF THE PREFERRED EMBODIMENTS

Figure 1:
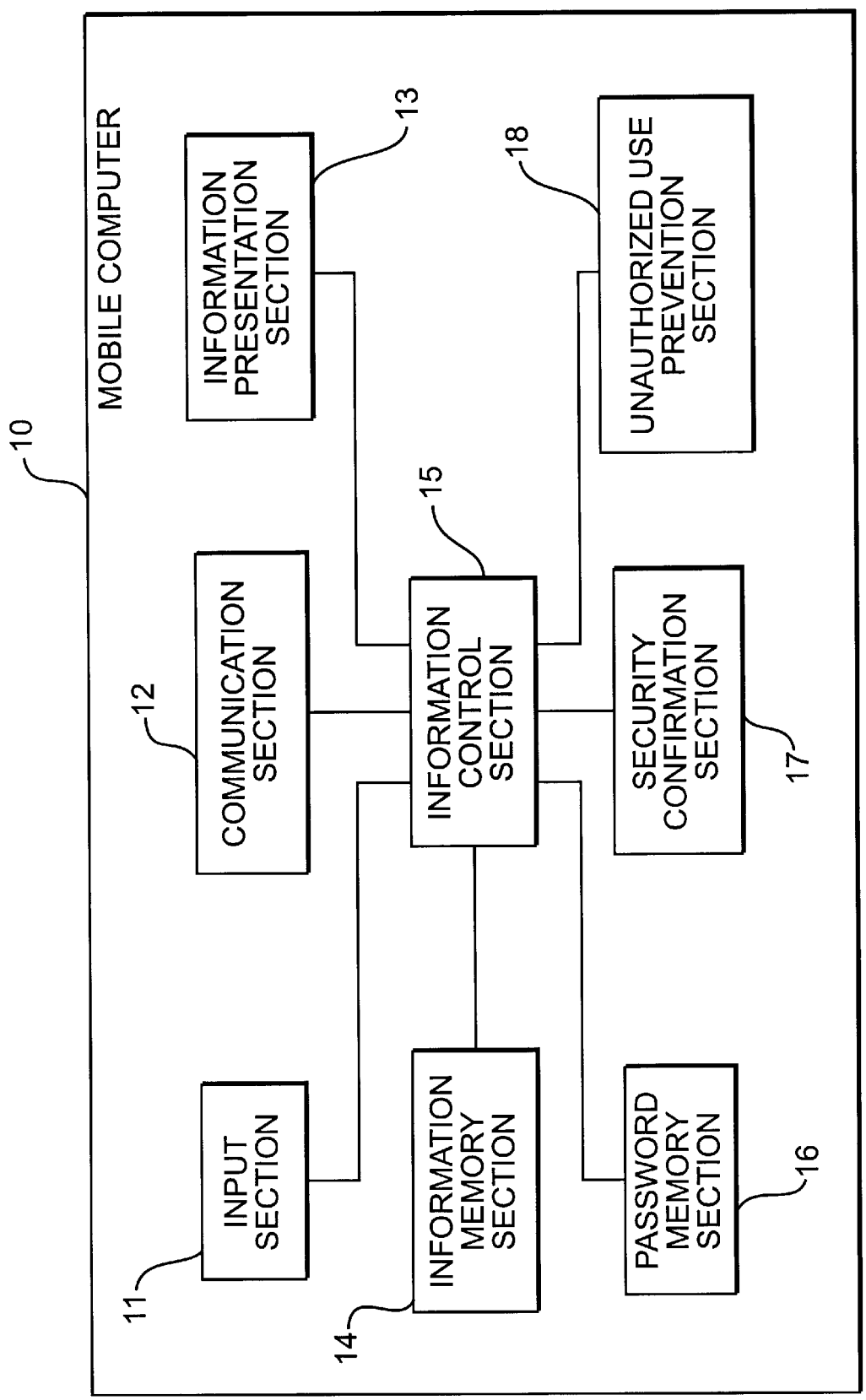
FIG. 1 is a block diagram of a mobile computer according to a first embodiment of the present invention.

FIG. 1 is a block diagram of a mobile computer according to a first embodiment of the present invention. In FIG. 1, an input section 11 such as a pen inputs a password and an operation indication by the user. A communication section 12, such as IrDA (infrared rays), wireless LAN, PHS, or modem to connect to telephone circuit, transmits (sending and receiving) the information. An information presentation section 13 such as liquid crystal panel outputs the information. An information memory section 14 such as a flash-memory card memorizes the information inputted by the input section 11 or received by the communication section 12. A password memory section 16 stores the password to confirm the user's use authorization. A security confirmation section 17 requests the user to input the password when an indication to move from the screen outputted by the information presentation section 13 in case of activation to another screen is inputted through the input section 11. An unauthorized use prevention section 18 turns off the power supply of the mobile computer 10 and records the unauthorized use if the input password requested by the security confirmation section 17 does not coincide with the password stored in the password memory section 16. An information control section 15 controls information exchange of the input section 11, the communication section 12, the information presentation section 13, the information memory section 14, the password memory section 16, the security confirmation section 17 and the unauthorized use prevention section 18.

Figure 2:
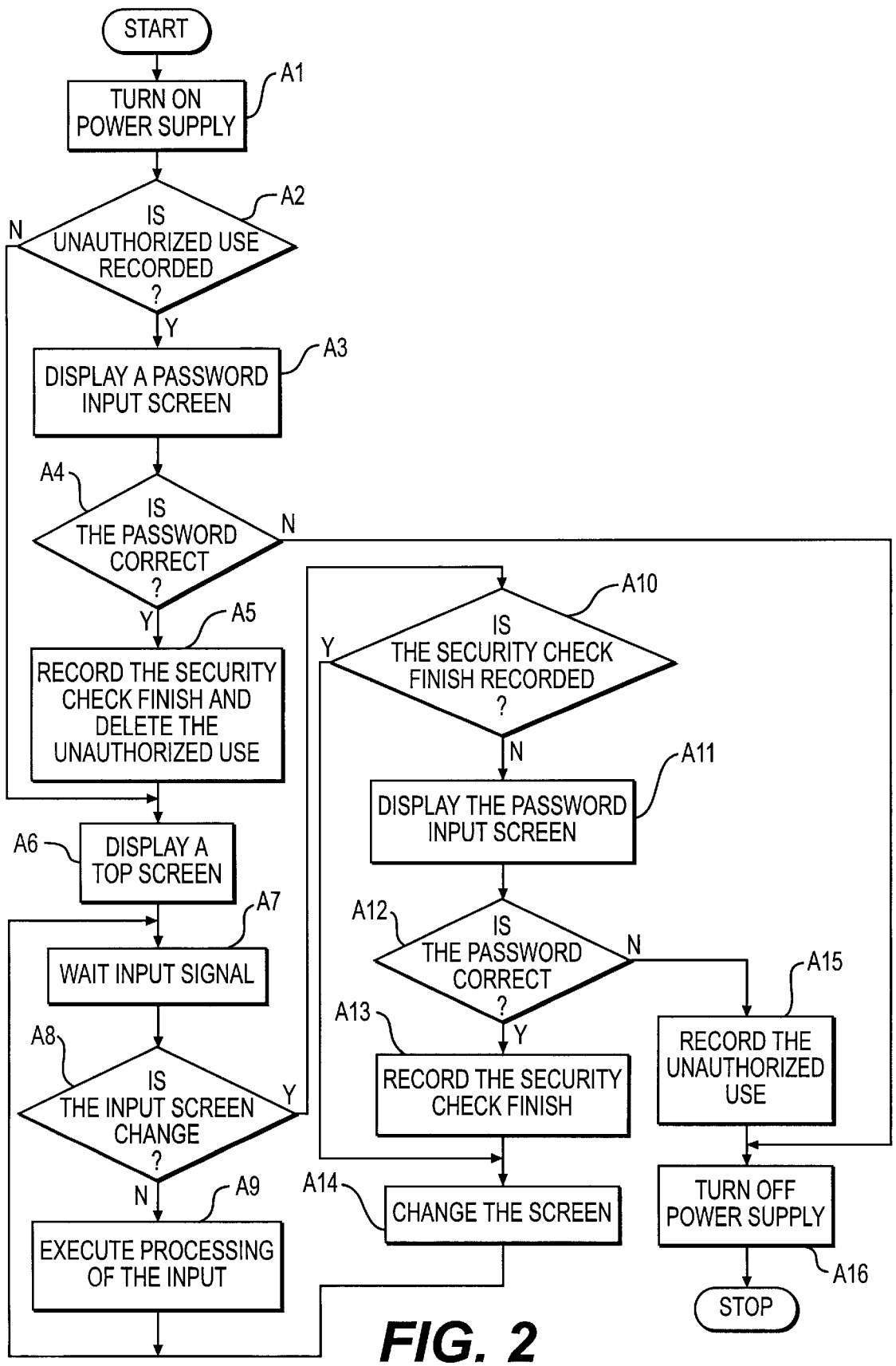
FIG. 2 is a flow chart of the processing of the mobile computer according to the first embodiment.

FIG. 2 is a flow chart of the processing of the mobile computer according to the first embodiment of the present invention. When the user turns on the power supply of the mobile computer (step A1), the computer checks whether the use of the mobile computer has been authorization before by referring to the record of the unauthorized use prevention section 18 (step A2). If the unauthorized use is not recorded (Y of step A2), a top screen is displayed by the information presentation section 13 as shown in FIG. 3 (step A6). FIG. 3 is a schematic diagram of an example of a schedule control program mostly used for the mobile computer. In FIG. 3, when the user indicates a button icon such as "MAIL" or "TELEPHONE", arranged at upper side, the screen is changed to the application program corresponding to the button icon. The schedule control program in FIG. 3 corresponds to a monthly schedule. Each schedule is shortly displayed on the column of each day. When the user selects his desired day, a detailed schedule of the selected day is displayed. A command tool such as an editing function is arranged at the left side. These command tools are continuously displayed even if the screen is changed. In the command tools, a non-used tool is lightly displayed and is not activated even if the user erroneously indicates the command tool. When the top screen as shown in FIG. 3 is displayed, the mobile computer 10 waits input from the user (step A7). When the user inputs using a pen or an input device, the input is determined to be the indication necessary for a screen change by referring to a correspondence table stored by the unauthorized use prevention section 18 as shown in FIG. 4 (step A8). For example, assume that the user selects the item "MAIL" in the top screen of FIG. 3. In this case, the item "MAIL" is included in the correspondence table in FIG. 4. Therefore, this indication is decided to be the input necessary for screen change. In the same way, assume that the user selects the daily item "1/16" in FIG. 3. In this case, the daily item is included as "SCHEDULE DATE CHANGE" in FIG. 4. Therefore, this indication is also decided to be the input necessary for a screen change. As for items not included in the correspondence table in FIG. 4, the screen change is not necessary (N of step A8). In this case, the processing corresponding to the input is executed (step A9). After the processing, it is returned to an "AWAIT-INPUT" situation (step A7) again and the next input is received.

Figure 6:
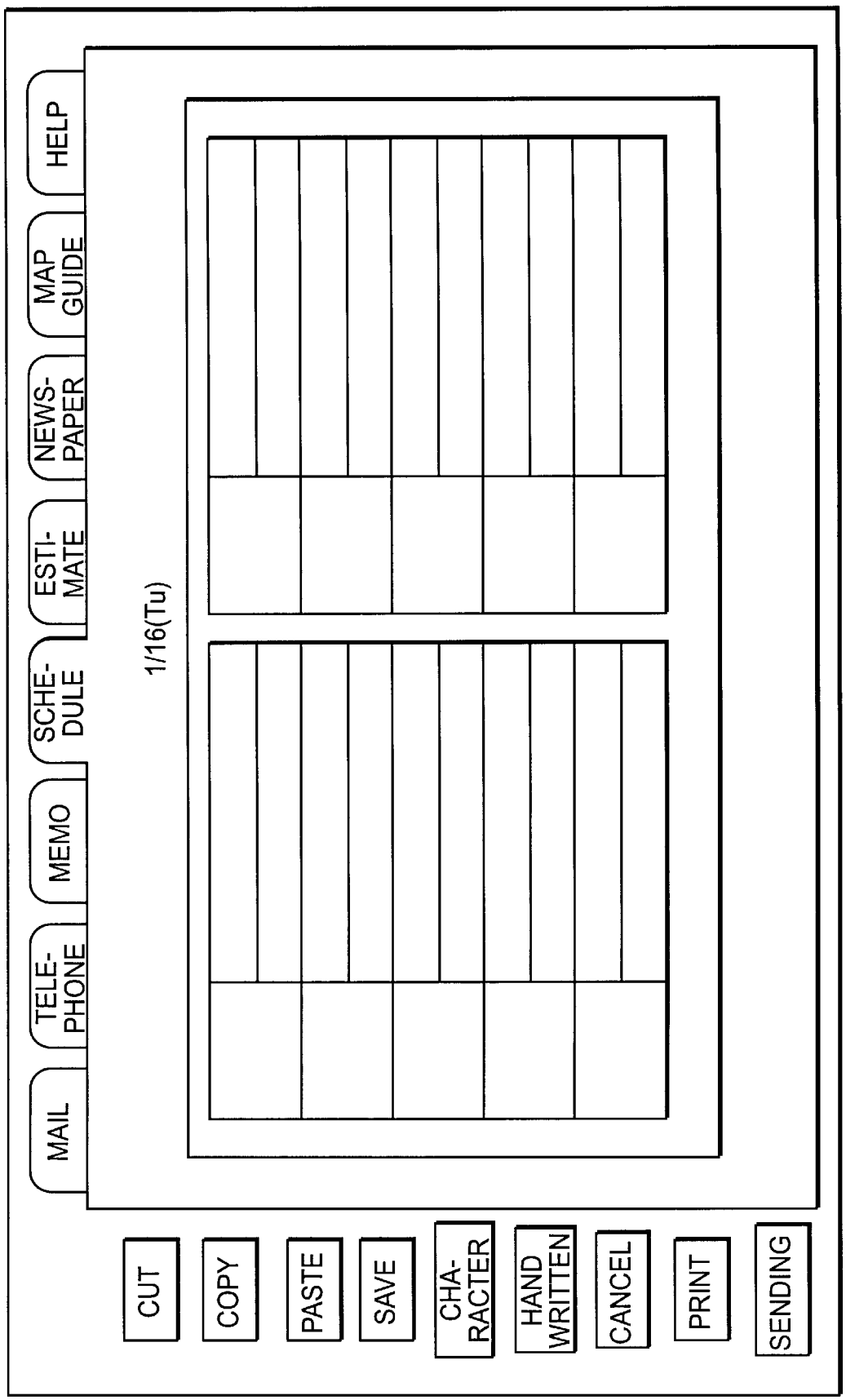
FIG. 6 is a schematic diagram of a display example of the schedule screen according to the first embodiment.

On the other hand, if the indication is determined to be the input necessary for a screen change (Y of step A8), it means that more detailed information must be displayed. Accordingly, before the screen is changed, the unauthorized use prevention section 18 displays the password confirmation screen shown in FIG. 5 to confirm whether the present user is the authorized user (step A11). In this case, if the user is requested to input the password whenever the screen is changed, the user's burden increases. Accordingly, it is decided whether the security check finish is recorded (step A10). If the security check finish is not recorded (N of step A10), the security confirmation section 17 confirms that a password inputted by the user coincides with the password stored in the password memory section 16 (step A12). If the input password coincides with the stored password (Y of step A12), the security check finish is recorded (step A13). Then, the password confirmation screen is erased (step A14) and a detailed schedule screen of indicated day (1/16) is newly displayed as shown in FIG. 6.

On the other hand, if the input password does not coincide with the stored password (N of step A12), the unauthorized use prevention section 18 records data of the unauthorized use. The data of the unauthorized use consists of the time and input password used by the party attempting to use the computer without authorization. This record is sent to a server as mail when the mobile computer is connected to a network. The unauthorized use prevention section 18 turns off the power supply of the mobile computer 10 to prohibit the unauthorized use after recording the data of the unauthorized use (step A16).

The unauthorized use prevention section may also be configured to give the user more than one chance to enter the correct password before shutting off the power. For example, the unauthorized use prevention section may inform the user of an incorrect password. If the password is incorrect a second time, the power is shut off.

Figure 5:
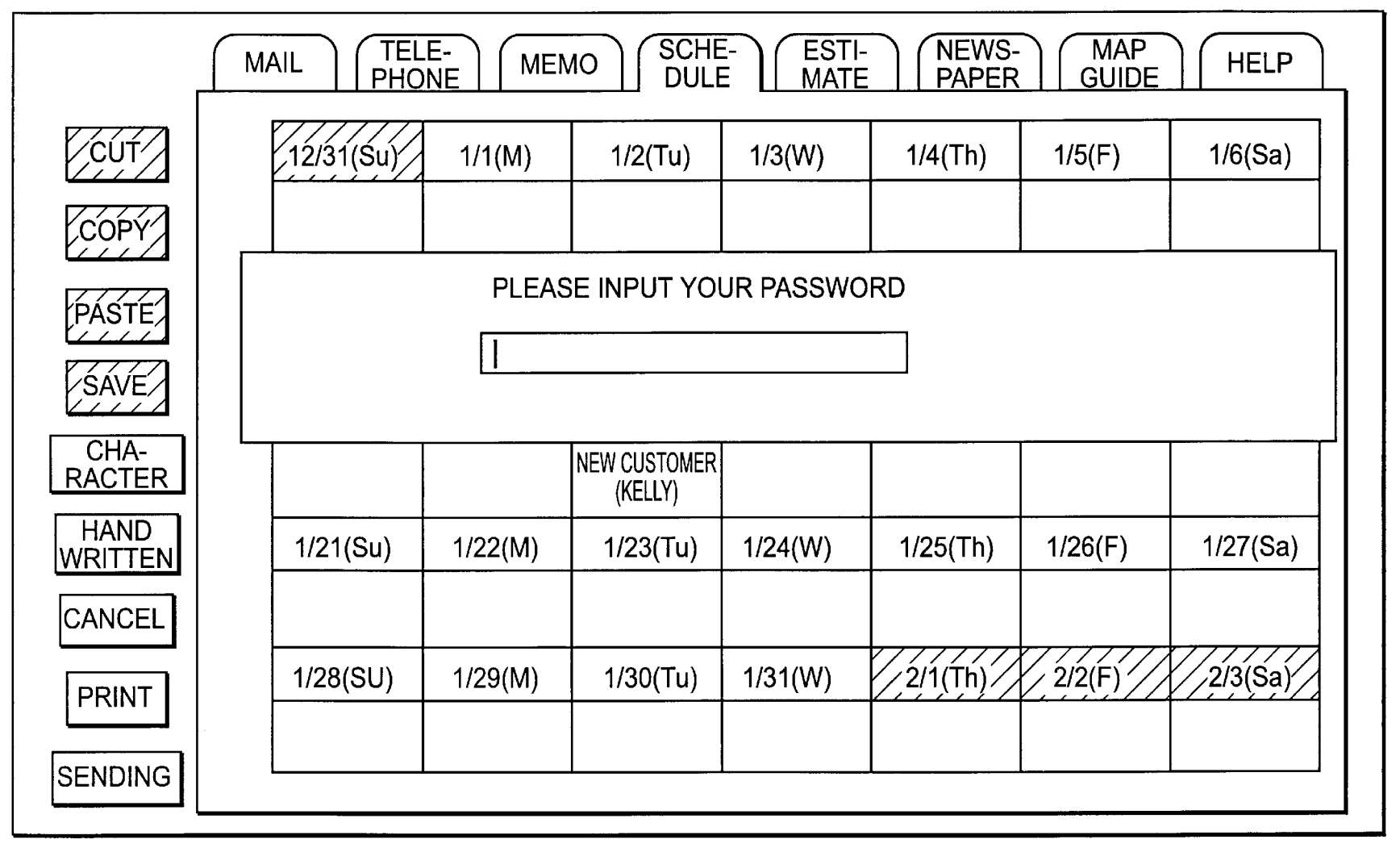

As the mentioned above, in case of turning on the power supply, the unauthorized use is already recorded (Y of step A2), the password input confirmation screen shown in FIG. 5 is displayed (step A3). In this case, if a correct password is inputted by the user (Y of step A4), data that the security check is finished is recorded and the data of the attempted unauthorized use is deleted in the unauthorized use prevention section 18 (step A5). Then, the top screen is newly displayed (step A6).

In short, in the mobile computer of the first embodiment, the user is requested to input the password when more detailed information is accessed. Therefore, the user's burden decreases and the unauthorized use by another person is prevented when the user leaves the mobile computer behind.

In the first embodiment, the password is described by a character code such as an alphameric code. However, the password is not limited to this. For example, in many mobile computers, pen input is used instead of a keyboard. In this case, the password input consisting of codes is troublesome for the user. Therefore, the time length of touch and the interval of the pen such as a Morse signal may be used as the password. In addition to this, the touch position of the pen may be combined with the password in order to raise the level of security.

Furthermore, in case that the mobile computer is equipped with a resume function (turning on/off the power supply under a condition that the application is activated), the above-mentioned function is not well executed because the flag of security check finish is already recorded. In order to cope with this, in case the resume function is set, the data of the security check finish is deleted when the power supply is turned off.

Figure 7:
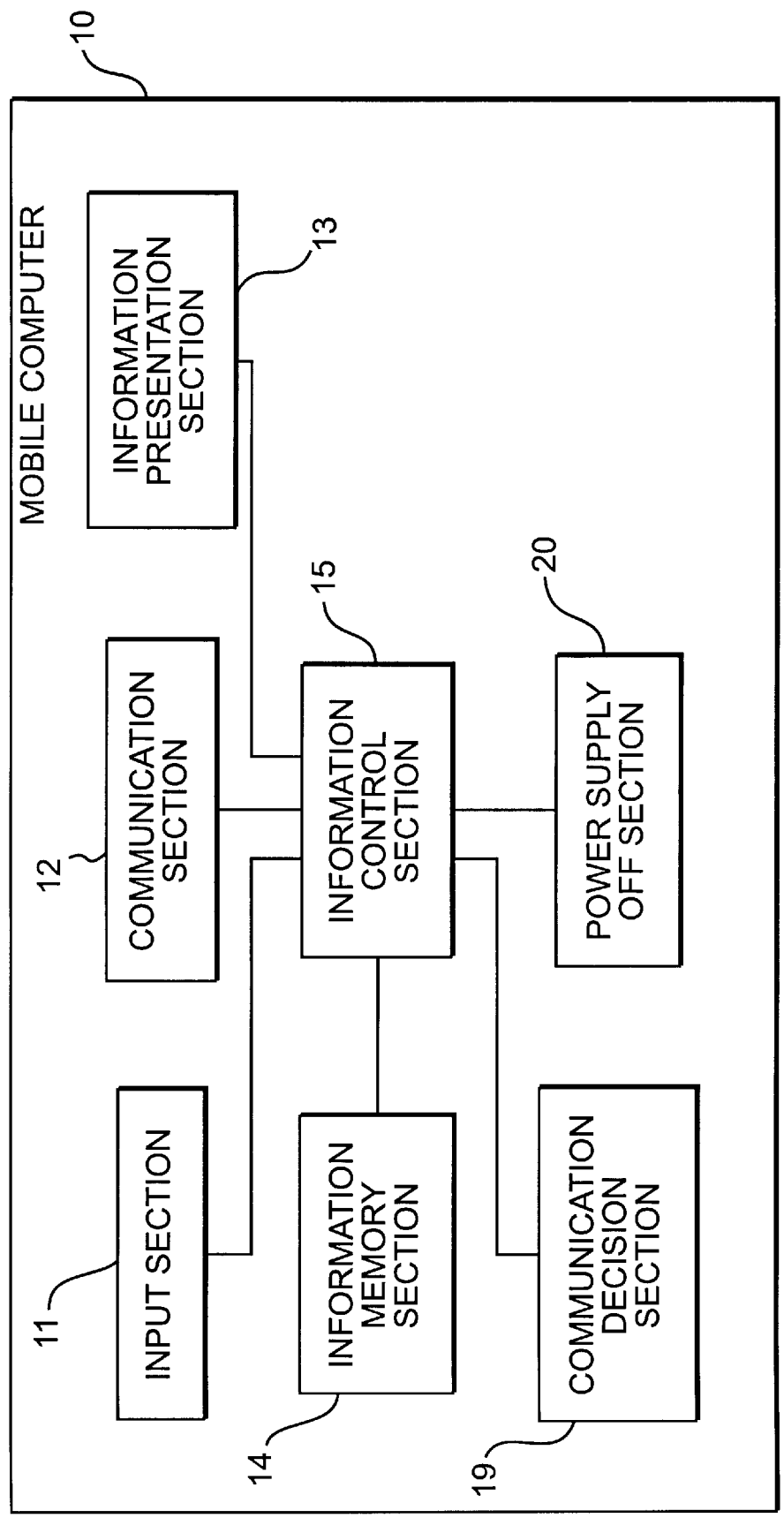
FIG. 7 is a block diagram of the mobile computer according to a second embodiment of the present invention.

Next, a second embodiment of the present invention will be explained. FIG. 7 is a block diagram of the mobile computer according to the second embodiment of the present invention.

In FIG. 7, an input section 11 such as a pen inputs a password, an operation indication, and a setting of "automatic end" by the user. A communication section 12, such as IrDA (infrared rays), wireless LAN, PHS, or modem to connect to telephone circuit, transmits (sending and receiving) the information. An information presentation section 13 such as liquid crystal display panel outputs the information. An information memory section 14 such as a flash-memory card memorizes the information inputted by the input section 11 or received by the communication section 12. A communication decision section 19 decides whether the transmission of information by the communication section 12 is finished without error. A power supply off section 20 turns off the power supply if the communication decision section 19 decides that the transmission is finished normally and the automatic end is set by the input section 11. The information control section 15 controls the information exchange of the input section 11, the communication section 12, the information presentation section 13, the information memory section 14, the communication decision section 19 and the "power supply off" section 20.

Figure 8:
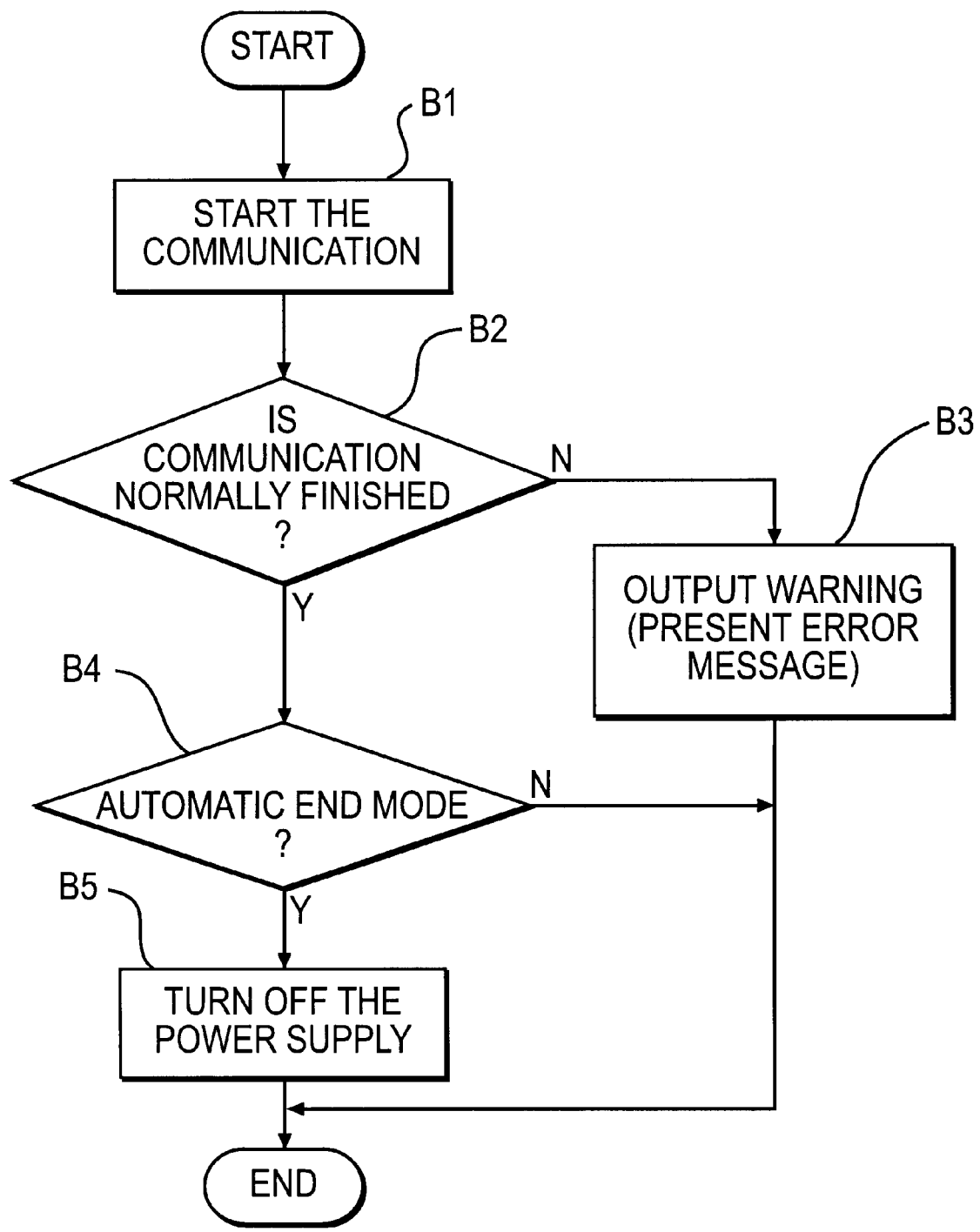
FIG. 8 is a flow chart of the processing of the mobile computer according to the second embodiment.

FIG. 8 is a flow chart of processing of the mobile computer according to the second embodiment of the present invention. In the flow chart of FIG. 8, the timing that communication starts is described as a first step (step B1). It is difficult to decide whether the transmission is finished normally for all cases. On the other hand, in case of a file transmission, the predetermined flag "EOF (End of file)" is attached to the end of the file. Therefore, if the predetermined flag is detected, it is determined that the file is correctly transmitted. In communication between the mobile computer and the server of the center, the predetermined flag "EOF" is added to the end of the file as if it was a suspected file transmission and detected. In this case, the communication decision section 19 decides that the transmission is finished normally if "EOF" is detected (Y of step B2). If "EOF" is not detected, the communication is continued because the communication decision section 19 decides that the communication is not finished. When a predetermined time passed after all of the communication packets are sent, the communication decision section 19 decides that the communication is abnormally finished (N of step B2) and outputs a warning (beep sound) (step B3). In this case, error message ("communication is not normally executed. Please indicate again.") is presented. If the communication is normally finished (Y of step B2) and the automatic end mode is previously set (Y of step B4), the "power supply off" section 20 turns off the power supply (step B5). If the automatic end mode is not previously set (step B5), the power supply off section 20 does not turn off the power supply because the user operates the mobile computer 10 as it is.

In this way, in the second embodiment, when the communication of the data to be downloaded from the center is finished normally, the power supply is automatically turned off. Therefore, it is not necessary for the user to wait until the end of the communication, and consumption of the battery is greatly economized.

Figure 9:
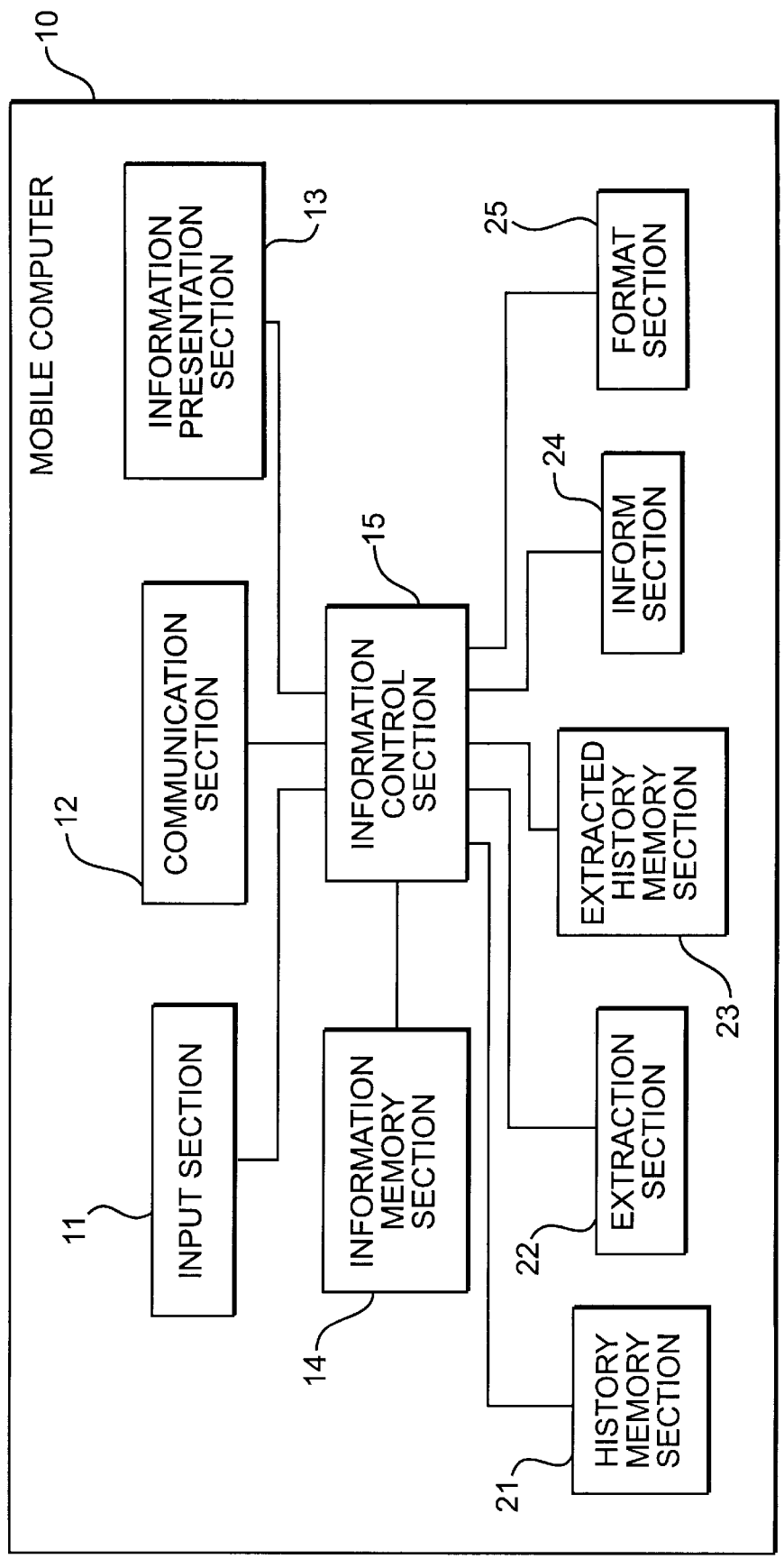
FIG. 9 is a block diagram of the mobile computer according to a third embodiment of the present invention.

Next, a third embodiment of the present invention will be explained. FIG. 9 is a block diagram of the mobile computer according to the third embodiment of the present invention. In FIG. 9, an input section 11 such as a pen inputs a password and an operation indication by the user. A communication section 12, such as an IrDA (infrared rays), wireless LAN, PHS, or modem to connect to telephone circuit, transmits (sending and receiving) the information. An information presentation section 13 such as liquid crystal display panel outputs the information. An information memory section 14 such as a flash-memory card memorizes the information inputted by the input section 11 or received by the communication section 12. A history memory section 21 stores the indication inputted by the input section 11 and the information accompanied with the indication. An extraction section 22 extracts the necessary part from the indication and the information stored in the history memory section 21. An extracted history memory section 23 stores the necessary part extracted by the extraction section 22. An inform section 24 sends the necessary part stored in the history memory section 23 periodically or under a condition of "sending-possible". A format section 25 formats the necessary part stored in the extracted history memory section 23 in a readable document format. The information control section 15 controls the information exchange of the input section 11, the communication section 12, the information presentation section 13, the information memory section 14, the history memory section 21, the extraction section 22, the extracted history memory section 23, the inform section 24, and the format section 25.

FIG. 10 is a schematic diagram of one example of the memory format of the history memory section 21. A first line represents that "SCHEDULE" is selected of "9601150830" (Jan. 15, 1996 AM8:30) and it's parameter (selected date) is "1/16". In the same way, a second line represents that "FILTERING" is selected of "9601150833" ("Jan. 15, 1996 AM8:33). A third line represents that "VIEWING" of a lower level icon is selected in the menu icon FILTERING". In this case, a parameter is not necessary for FILTERING" because "FILTERING" is a selection of the menu icon of upper level. The parameter "13531" of the lower level icon "VIEWING" is an article number selected by the user from an article list displayed as filtering. A fourth line represents that the user selects the icon "END" when "VIEWING" is finished.

Figure 12:
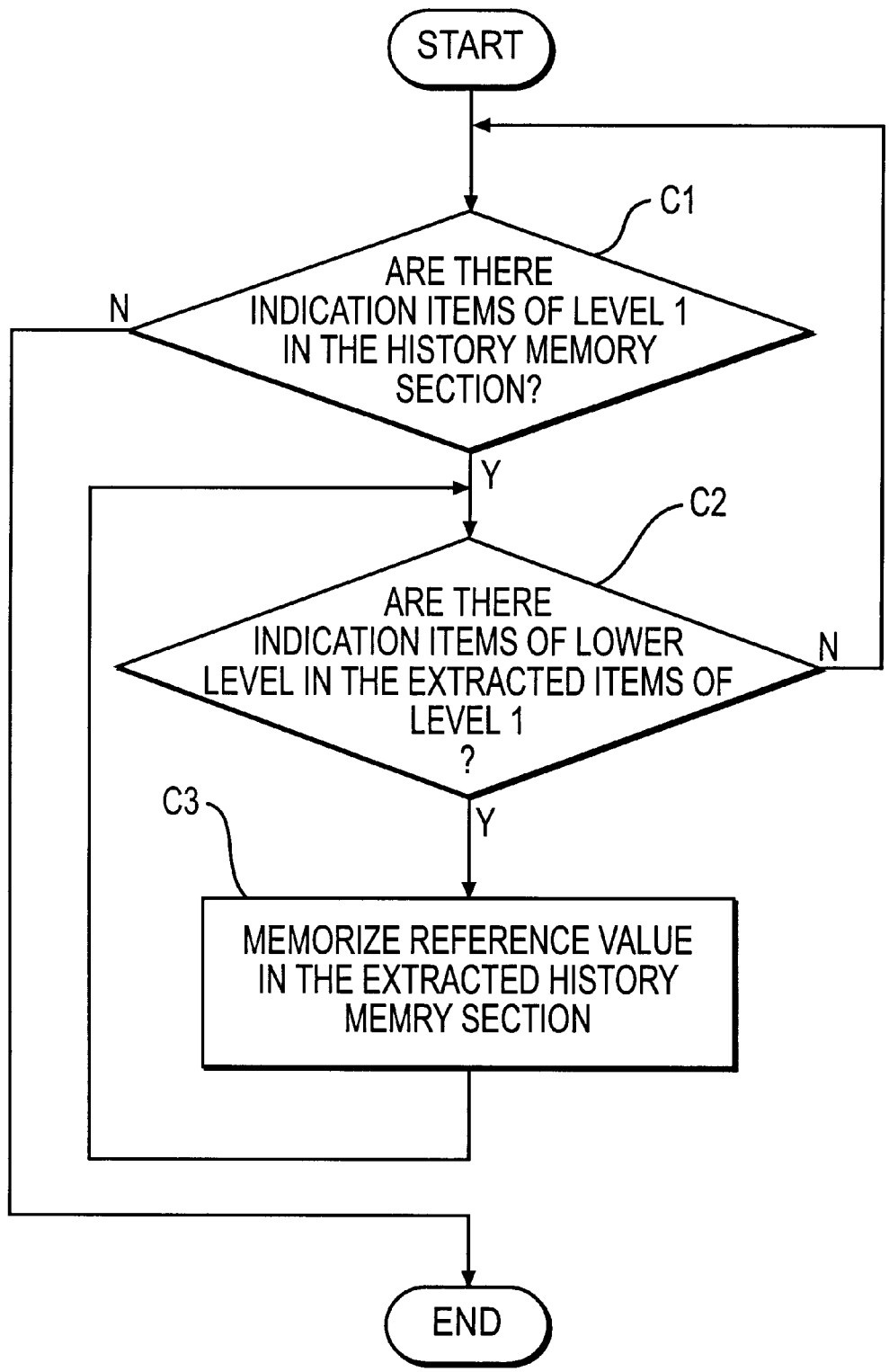
FIG. 12 is a flow chart of the processing of an extraction section according to the third embodiment.

FIG. 11 is a schematic diagram of one example of a memory format of the extracted history memory section 23. FIG. 12. is a flow chart of the processing of the extraction section 22. First, the memory format shown in FIG. 11 is explained in detail. In general, the indication includes a plurality of level (upper level (1), lower level (2)). For example, the indication to change the application is called the upper level, whereas, the indication to activate a detailed program in the application is called the lower level. In FIG. 11, each extracted item (indication) is stored by unit of the level. For example, FILTERING" is stored at level 1 because it is simply an application. "VIEWING" is stored at level 2 because it is the detailed program in "FILTERING". The reference value is the parameter to be recorded in daily report. For example, in "VIEWING", it is necessary to record which article is viewed in the daily report. Therefore, the article number viewed by the user is recorded as the reference number.

Next, the processing of the flow chart shown in FIG. 12 is explained in detail. In the indication items stored in the history memory section 21, the extraction section 22 decides whether the indication item of level 1 (application level) is included (step C1). In the example of FIG. 10, the second line "FILTERING" is selected. In this case (Y of step C1), the extraction section 22 decides whether the indication item of the lower level is included in "FILTERING" (step C2). In the example of FIG. 10, the third line "VIEWING" is selected. In this case (Y of step C2), the parameter "13531" of "VIEWING" is stored as a reference value in the extracted history memory section 23 (step C3). The above-mentioned processing is repeated. If all of the indication items of lower level are selected for the indication item of level 1 (N of step C2), this selection processing is executed for another indication item of level 1. In this way, the indication item of level 1, the indication item of level 2, and the corresponding reference value are stored in the extracted history memory section 23 as shown in FIG. 11. Then, the content of the extracted history memory section 23 is sent to another computer when the mobile computer 10 is connected to the network. In the example of FIG. 11, while the application of filtering is activated, identification numbers of articles which are viewed, saved, or sent as mail by the user are stored in the extracted history memory section 23. Accordingly, the identification numbers of articles are automatically sent to another computer on the manager's side.

In the third embodiment, the history memory section 21 previously stores the history of the user's indication. Accordingly, it is not necessary to newly store the history in response to a request of the application. Furthermore, if the history corresponding to a new application is stored, a new extracted item necessary for the new application is added to the content of the extracted history memory section 23. Conversely, if the new application are deleted, the new extracted items corresponding to the new application is deleted. In this case, it is easy not to extract the history corresponding to the new application.

In the third embodiment, the extracted history is stored in one file irrespective of the application. A method of using the extracted history is different by unit of application. Accordingly, it is possible to open another file by unit of the indication of level 1. Furthermore, the destination address is different by unit of the application. In this case, the destination address is filled in each file. It is possible to send the extracted history by unit of the destination address when the communication is possible.

In the example of FIG. 10, all of the indication items and parameters are extracted according to level. However, the extraction method is not limited to this. For example, if the user wants to extract the indication needed for predetermined time, time difference between a present indication and a next indication (needed time for the present indication) may be added in content of the hysteresis memory section 21. In this case, the indication item which the user viewed for predetermined time is only extracted as important items. Furthermore, in the example of FIG. 11, only parameter is stored as the reference value. However, it is not limited to this. The needed time of each indication item may be stored as one of the reference value in the extracted history memory section 23. The above-mentioned modification is able to be realized by changing the extraction items in FIG. 11. Furthermore, in order to decrease load of the extraction section 22, the information control section 15 may execute distributed processing for the extraction section 22.

FIG. 13 is a schematic diagram of another example of memory format of the extracted history memory section 23. FIG. 14 is a schematic diagram of a formatted example using the extracted items in FIG. 13 by the format section 25. A processing of the format section 25 is explained in detail. In FIG. 13, when a car salesman activates an assessment program of a used car to be traded in through the mobile computer, the indication items of level 1 (assessment program) is stored. While the car salesman inputs various kinds of data through the mobile computer, the indication items of level 2 (date, customer name, car type, assessed amount) and each reference value are stored. After the assessed amount is determined by activating the assessed program, when the car salesman activates the schedule program through the mobile computer, the indication items of level 1 (schedule), the indication items of level 2 (date of trade-in), and the reference value are also stored. By referring to each reference value shown in FIG. 13, an assessment report is automatically created as shown in FIG. 14. In this case, the inform section 24 previously stores a fixed form of the assessment report including a plurality of empty columns. Therefore, each reference value in FIG. 13 is filled in corresponding columns as shown in FIG. 14. In short, the assessment report is simply created by filling the reference value in corresponding columns of the fixed form.

A memory can be used to store instructions for performing the process described above. Such a memory can be CD-ROM, Floppy Disk, and so on.

What is claimed is:

1. A mobile computer, comprising:

a power supply for the mobile computer;

an input means for inputting a password and an operation indication for moving from one screen of activation time to another screen;

a password memory for storing the password to confirm use authorization of a user;

a correspondence table for storing a plurality of indication items of application to display more detailed information on the screen;

security confirmation means for requesting the user to input a password when the operation indication coincides with one of the indication items stored in said correspondence table; and unauthorized use prevention means for turning off the power supply if the input password requested by said security confirmation means does not coincide with the password stored in said password memory.

2. The mobile computer according to claim 1, wherein said unauthorized use prevention means includes means for recording data of unauthorized use in predetermined area if the input password requested by said security confirmation means does not coincide with the password stored in said password memory means, and wherein said security confirmation means includes means for requesting the user to input a password, if the data of the unauthorized use is recorded when the power supply is turned on.

3. The mobile computer according to claim 2, wherein said unauthorized use prevention means includes means for deleting the data of unauthorized use from the predetermined area if the input password requested by said security confirmation means coincides with the password stored in said password memory, when the data of unauthorized use is recorded in the predetermined area.

4. The mobile computer according to claim 1, wherein said unauthorized use prevention means includes means for recording security check finish data if the input password requested by said security confirmation means coincides with the password stored in said password memory.

5. The mobile computer according to claim 4, wherein said security confirmation means includes means for not requesting the user to input the password, when the operation indication for moving from one screen to another screen is inputted by said input means, if the security check finish data is recorded.

6. A mobile computer, comprising:

input means for inputting a plurality of kinds of operation indication and concrete parameter in correspondence with the operation indication;

a history memory for storing the operation indication and the concrete parameter in correspondence with the operation indication in order of input;

extraction means for extracting the operation indication and the concrete parameter from said history memory by unit of level, wherein the operation indication to activate an application is upper level and the operation indication to activate a detailed program in the application is lower level;

an extracted history memory for storing the operation indication and the concrete parameter by unit of the level extracted by said extraction means; and format means for formatting the operation indication and the concrete parameter stored in said extracted history memory in a readable document format according to the level.

7. The mobile computer according to claim 6, further including communication means for sending information to and receiving information from another computer, and means for sending the extracted operation indication and attached information through said communication means.

8. A method for controlling a mobile computer, comprising the steps of:

storing a password to confirm a user authorization;

storing a plurality of indication items of application to display more detailed information on a screen;

inputting an operation indication for moving from one screen of activation time to another screen;

requesting the user to input the password when the operation indication coincides with one of the stored indication items;

receiving the password of the user; and turning off a power supply of the mobile computer if the received password does not coincide with the stored password.

9. A method for controlling a mobile computer, comprising the steps of;

inputting a plurality of kinds of operation indication and concrete parameter in correspondence with the operation indication;

storing the operation indication and the concrete parameter in correspondence with the operation indication in order of input in a machine readable memory;

extracting the operation indication and the concrete parameter from the machine readable memory by unit of level, wherein the operation indication to activate an application is upper level and the operation indication to activate a detailed prigram in the application is lower level;

storing the extracted operation indication and the extracted concrete parameter by unit of the level in a machine readable memory; and formatting the extracted operation indication and the extracted concrete parameter stored in the machine readable memory in a readable document format according to the level.

10. A computer readable memory containing computer readable instructions, comprising:

instruction means for causing a computer to store a password to confirm the authorization of a user;

instruction means for causing a computer to store a plurality of indication items of an application to display more detailed information on a screen;

instruction means for causing a computer to input an operation indication for moving from one screen of activation time to another screen;

instruction means for causing a computer to request the user to input the password when the operation indication coincides with one of the stored indication items;

instruction means for causing a computer to receive a password of the user; and instruction means for causing a computer to turn off a power supply of a mobile computer if the received password does not coincide with the stored password.

11. A computer readable memory containing computer readable instructions, comprising:

instruction means for causing a computer to input a plurality of kinds of operation indication and concrete parameter in correspondence with the operation indication;

instruction means for causing a computer to store the operation indication and concrete parameter in correspondence with the operation indication in order of input;

instruction means for causing a computer to extract the operation indication and the concrete parameter from the stored operation indication and the stored concrete parameter by unit of level, wherein the operation indication to activate an application is upper level and the operation indication to activate a detailed program in the application is lower level;

instruction means for causing a computer to store the extracted operation indication and the extracted concrete parameter by unit of level; and instruction means for causing a computer to format the extracted operation indication and the extracted concrete parameter in a readable document format according to the level.

* * * * *

UNITED STATES PATENT AND TRADEMARK OFFICE
CERTIFICATE OF CORRECTION

PATENT NO. : 5,978,919
DATED : November 2, 1999
INVENTOR(S) : Miwako DOI et al.

It is certified that error appears in the above-identified patent and that said Letters Patent is hereby corrected as shown below:

Title Page, Item [57], in the Abstract, line 8, before "screen", delete "a".

Claim 9, Col. 11, line 58, "of;" should read --of:--.

Claim 9, Col 12, line 8, "prigram" should read --program--.

Signed and Sealed this

Fifteenth Day of August, 2000

Attest:

Q. TODD DICKINSON

Attesting Officer

Director of Patents and Trademarks